(12) United States Patent
Huntley, III et al.

(10) Patent No.: US 11,720,827 B2
(45) Date of Patent: Aug. 8, 2023

(54) METHOD AND SYSTEMS FOR DEPARTURE CONTROL

(71) Applicant: SITA Information Networking Computing UK Limited, Middlessex (GB)

(72) Inventors: Lee William Huntley, III, Ball Ground, GA (US); Stephen David Goddard, Wick (GB); Maurice Royston Pope, Halesowen (GB)

(73) Assignee: SITA Information Networking Computing UK Limited

( * ) Notice: Subject to any disclaimer, the term of this patent is extended or adjusted under 35 U.S.C. 154(b) by 331 days.

(21) Appl. No.: 15/979,851

(22) Filed: May 15, 2018

(65) Prior Publication Data

US 2019/0354902 A1 Nov. 21, 2019

(51) Int. Cl.
*G06Q 10/02* (2012.01)
*G06F 16/25* (2019.01)
*G06F 16/955* (2019.01)

(52) U.S. Cl.
CPC ........... *G06Q 10/02* (2013.01); *G06F 16/252* (2019.01); *G06F 16/955* (2019.01)

(58) Field of Classification Search
CPC ........ G06Q 10/02; G06Q 50/30; G06Q 50/14; G06Q 10/08; G06F 16/252; G06F 16/955; G06F 16/90
USPC .......................................................... 705/5
See application file for complete search history.

(56) References Cited

U.S. PATENT DOCUMENTS

| 2002/0152100 A1 | 10/2002 | Chen et al. |
| 2003/0177044 A1 | 9/2003 | Sokel et al. |
| 2005/0109843 A1* | 5/2005 | Dove ...................... B64F 1/366 |
| | | 235/382 |

(Continued)

FOREIGN PATENT DOCUMENTS

| CH | 710509 A2 * | 6/2016 | .......... G06F 11/2023 |
| WO | 20170037235 A1 | 3/2017 | |
| WO | WO-2017037234 A1 * | 3/2017 | ............. G06Q 10/02 |

OTHER PUBLICATIONS

Mansel, Douglas M., and Peter B. Mandle. "Off-airport passenger check-in facilities at satellite terminals: A review." Transportation research record 1703.1 (2000): 98-104. (Year: 2000).*

(Continued)

*Primary Examiner* — Jeff Zimmerman
*Assistant Examiner* — Brian A Tallman
(74) *Attorney, Agent, or Firm* — Morris, Manning & Martin, LLP; Daniel E. Sineway, Esq.; Adam J. Thompson, Esq.

(57) ABSTRACT

A flight departure control system comprises a central departure control system and a plurality of local departure control systems arranged at or in proximity of individual airports. Passengers check-in for flights via the central DCS and for each passenger a passenger data message is created and sent to the local DCS to which the flight relates. On detection of a fault condition at the central DCS or in communications with the central DCS, the local DCS assume responsibility for flights departing from the airport at which they are located based on the received passenger data messages and unchecked-in passengers check-in directly with the local DCS.

19 Claims, 4 Drawing Sheets

(56) References Cited

U.S. PATENT DOCUMENTS

| | | | | |
|---|---|---|---|---|
| 2005/0258231 | A1* | 11/2005 | Wiater | G06Q 10/08 |
| | | | | 235/375 |
| 2006/0145852 | A1* | 7/2006 | McElhannon | G06Q 90/00 |
| | | | | 340/572.1 |
| 2008/0288302 | A1 | 11/2008 | Daouk et al. | |
| 2011/0231212 | A1* | 9/2011 | Hurley | G06Q 10/02 |
| | | | | 705/5 |
| 2012/0265562 | A1 | 10/2012 | Daouk et al. | |
| 2012/0331087 | A1* | 12/2012 | Luna | H04L 67/289 |
| | | | | 709/213 |
| 2017/0026473 | A1* | 1/2017 | Dersy | H04L 67/42 |

OTHER PUBLICATIONS

U.S. Department of Homeland Security "Frequently Asked Questions, U.S. Customs and Border Protection Receipt of Passenger Name Record (PNR) Data", Jun. 21, 2013. (Year: 2013).*
https://www.damarel.com/products/backup-dcs/.
https://amadeus.com/en/portfolio/ground-handlers/local-dcs.
https://www.airlinesoftware.net/product/1406/simplair.

* cited by examiner

METHOD AND SYSTEMS FOR DEPARTURE CONTROL

This invention relates to departure control systems and methods. It is particularly related to airport and airline departure control systems and also to their interaction with other modes of transport, for example, but not limited to cruise ships.

Airline departure control systems automate the processing of flights from airports. A Departure Control System (DCS) typically manages information required for airport check-in, the printing of boarding cards, the acceptance of baggage, aircraft boarding, load control and aircraft checks. Departure control systems typically interact with reservation systems through which tickets are purchased. In some instances, the reservation and DCS are separate systems, in others they are integrated as part of an airline's overall booking and control system.

Departure control systems can receive reservation data from the reservation systems in a Passenger Name Record (PNR). A DCS may update the status of a reservation, for example, to mark it as checked-in, boarded or flown and return that status information to the reservation system.

Leading up to, and on the day of flight departure, passengers are checked in to the DCS system. As well as recording the passenger status, the DCS will record baggage details, seating details and general requirements for the flight or flights on which the passenger is due to travel. Baggage labels and boarding passes may be issued from the DCS to enable the passenger's baggage to reach its destination and the passenger to pass through the airport and board their aircraft. In more modern check-in procedures, in which passengers can check-in in advance through a smart device or web access, the advance check-in is registered with the reservation system which generates a check-in message (CK-IN). When the PNL is transferred to the DCS, the PNL for a checked-in passenger includes the CK-IN message, assigned seat and any other information such as baggage information so that the DCS can update the status of the passenger to 'checked-in'.

Historically, scheduled carriers have tended to operate their own centralised reservation systems. Some charter airlines also operated their own reservation system while others communicated with industry-wide reservation systems. If an airline is operating a central reservation system, that is a single departure control system for their global operations, that departure control system must be able to communicate with all airports worldwide from which the airline is operating so that airline agents, for example, at a check-in desk, can access the system in real time. Charter airlines have also tended to use centralised DCS, however they typically use a DCS owned and operated by a handling agent which serves a number of airlines and is partitioned by airline.

Although these airlines have local access to the DCS via check-in desks at airports, there is no local storage of data; the central DCS is the sole repository of data.

In some instances, airlines operate local departure control systems. In contrast to a central DCS, a local DCS is specific to a given airport and is particularly suited to airlines which only operate from a single airport. An example of a local DCS is the Maestro DCS Local provided by SITA Information Networking Computing Inc., of Atlanta, Ga., USA.

Networked central DCS solutions typically involve the mainframe DCS being located somewhere other than an operational airport. Such systems are vulnerable to power outages and system failures. In recent years there have been a number of highly publicised system failures involving major international carriers which have led to severe disruption. Although operating rules require airlines to provide at least a manual backup, the complexity of modern systems is such that such manual backups are no longer feasible. Moreover, the cost of replicating a centralised DCS at an alternative site, including its own separate power supply and communications links globally, is considered prohibitively expensive by airlines. Thus, airlines remain vulnerable to their departure control systems failing.

The consequences of power outages or other system failures have become more pronounced as airport systems for passenger flights and processing have become more reliant on DCS data for validating passengers' authorisation to travel when passing into passenger-only secured areas of a terminal building. In some cases, a passenger boarding pass is wholly integrated with the airline DCS such that the passenger cannot pass through, for example, electronic departure gates, without the boarding pass information retrieved from a scan of the boarding pass being checked with the DCS. The effect of a DCS failure is exacerbated in such systems.

The invention aims to address the problems identified above.

SUMMARY OF THE INVENTION

According to a first aspect of the invention there is provided a method of operating a computerised airline departure control system, the system comprising a central departure control system and a plurality of local departure systems, the method comprising: receiving via a communications interface check-in information for a flight from an airport for at least one passenger at the central departure control system, the central departure control system being responsible for controlling departure of the flight; forming from the check-in information a passenger data message for the at least one passenger, the passenger data message comprising information necessary to validate the passenger to which it relates for boarding the flight for which they are checked-in; sending the passenger data message from the central departure control system to the respective local departure control system for the flight; storing the passenger data message at the local departure control system; and on recognition of non-availability of communications with the central departure control system, the local departure control system assuming responsibility for the flight.

Embodiments of the invention may have the advantage that the effects of the non-availability of a central DCS may be ameliorated with responsibility for departure of a given flight being transferred to a local departure control system for each flight. This has the further advantage of preventing flight delays which cause passenger frustration, damage airlines' reputations and can incur financial penalties.

In one embodiment of the invention, after the local departure control system assumes responsibility for a flight, unchecked-in passengers may check-in to the local departure control system.

In one embodiment of the invention the passenger data message may sent individually from the central departure control system to the local departure control system to which the flight relates. Alternatively, batches of passenger data messages may be sent from the central departure control system to the local departure control system to which the flight relates.

On receipt of a passenger data message, the local DCS may overwrite data relating to the passenger with the passenger data message in a database of the local departure control system.

In one embodiment of the invention, on receipt of a passenger data message, the local DCS may create a new record for the passenger if no passenger record exists at the local departure control system and stores the passenger data message against the new record.

The non-availability of communications with the central departure control system may due to a fault at the central departure system or in communications with the central departure system.

In one embodiment, the recognition of the non-availability of the central departure control system comprises automatic detection of said non-availability.

In one embodiment the passenger data message further comprises a validation for the passenger to enter secure areas of an airport.

This aspect of the invention also resides in method of operating a computerised airline departure control system, the system comprising a central departure control system and a plurality of local databases, each local database having a data reference pool for validation of passenger data, the method comprising: receiving via a communications interface check-in information for a flight from an airport for at least one passenger at the central departure control system, the central departure control system being responsible for controlling departure of the flight; forming from the check-in information a passenger data message for the at least one passenger, the passenger data message comprising information necessary to validate the passenger to which it relates for boarding the flight for which they are checked-in; sending the passenger data message from the central departure control system to the respective local database for the flight; storing the passenger data message at the local database; and on recognition of non-availability of communications with the central departure control system, the local database assuming responsibility for the flight.

This aspect of the invention also resides in a computerised airline departure control system, comprising a central departure control system for controlling departure of flights from a plurality of airports, and a plurality of local departure systems, each local departure control system for controlling departure of flights from an individual airport, wherein the central departure control system includes a communications interface and is arranged to receive check-in information for a flight from an airport for at least one passenger via a communications network, the central departure control system being responsible for controlling departure of the flight; wherein the central departure control system forms a passenger data message for the at least one passenger, the passenger data message comprising information necessary to validate the passenger to which it relates for boarding the flight for which they are check-in; wherein the central departure control system sends the passenger data message via a communications network to the respective local departure control system for the flight; the local departure control systems each comprising a communications interface and a store for storing the received passenger data messages; and a detector arranged at the local departure control systems for detecting the non-availability of the central departure control system, and, on detection, causing the local departure control system to assume responsibility for the flight.

A second aspect of the invention resides in a method of operating a computerised airline departure control system, the system comprising a central departure control system and at least one local departure system arranged on board a ship and in intermittent contact with the central departure control system, the method comprising: receiving check-in information for a flight from an airport from passengers on the ship via a communications interface at the shipboard local departure control system, the local departure control system checking-in passengers on the basis of the received check-in information, the central departure control system being responsible for controlling departure of the flight; forming a passenger data message for the each of the passengers at the local departure control system based on the check-in information, each passenger data message comprising information necessary to validate the passenger to which it relates for boarding the flight for which they are checking-in; sending the passenger data message for each checked in passenger via a communications network from the local departure control system to the central departure control system for the flight when the shipboard departure control system is able to communicate with the central control system; and receiving and storing the passenger data messages at the central departure control system.

This aspect of the invention may have the advantage of facilitating the checking in of cruise ship passengers who are transferring from the cruise ship to airlines. It addresses problems of lack of low cost connectivity which are inherent with cruise ships sailing away from land.

In one embodiment, on receipt of a passenger data message, the central departure control system overwrites data stored at the central departure control system relating to the passenger with the passenger data message in a database of the central departure control system.

In one embodiment, on receipt of a passenger data message, the central departure control system creates a new record for the passenger if no passenger record exists at the central departure control system, and stores the passenger data message in a database of the central departure control system against the new record.

In each aspect of the invention the passenger data message may include a flight identifier, departure airport identifier, passenger identifier and check-in status. It may further include one or more of an airline code, a seat number, baggage information, connecting flight information, travel document information and security information.

This aspect of the invention also resides in a computerised airline departure control system, comprising, a central departure control system, and at least one local departure system arranged on-board a ship and in intermittent contact with the central departure control system via a communications network, wherein the shipboard local departure control system is arranged to receive via a communications interface check-in information for a flight from an airport from passengers on the ship, the shipboard local departure control system checking-in passengers on the basis of the received check-in information and issuing boarding passes, the central departure control system being responsible for controlling departure of the flight; wherein the shipboard local departure control system is configured to form a passenger data message for the each of the passengers, each passenger data message comprising information necessary for the passenger to which it relates to board the flight for which they are checking in; wherein the shipboard departure control system is configured to send the passenger data message for each checked in passenger from the local departure control system to the central departure control system for the flight via a communications network when the shipboard local departure control system is able to communicate with the central control system; and wherein the central departure system includes a store and is configured to receive and store the passenger data messages sent from the shipboard local departure control system at the central departure control system.

A further aspect of the invention resides in a method of operating a computerised airline departure control system, the system comprising a central departure control system and a plurality of local departure systems, the method comprising: receiving via a communications interface check-in information for a flight from an airport for at least one passenger at the central departure control system, the central departure control system being responsible for controlling departure of the flight; forming from the check-in information a passenger data message for the at least one passenger, the passenger data message comprising information necessary to validate the passenger to which it relates for boarding the flight for which they are checked-in; sending the passenger data message from the central departure control system to the respective local departure control system for the flight, the local departure control system being a part of a local airport network; storing the passenger data message in a secure database at the local departure control system; and providing access to the passenger data message stored in the stored database to systems connected to the local airport network for validation of a passenger boarding pass to which the passenger data message relates.

This aspect of the invention may have the advantage of providing local access to passenger data which may be used by local airport systems to validate a passenger, for example during the passenger's transit through various secure points in the airport. This may be achieved in a more accurate, reliable and timely manner than validation via a central departure control system.

DESCRIPTION OF THE DRAWINGS

Embodiments of the invention will now be described, by way of example only, and with reference to the accompanying drawings in which.

Figure 1:
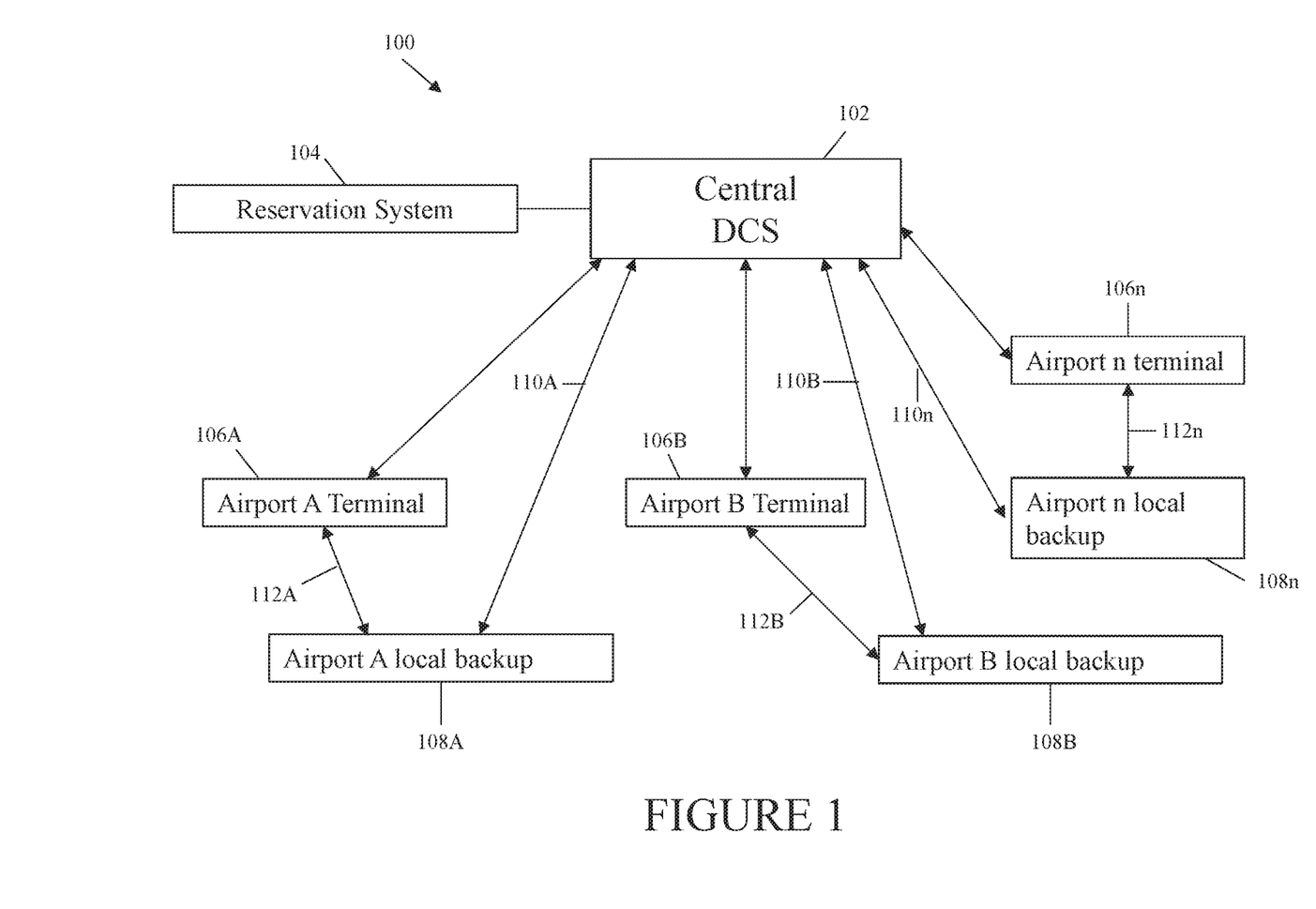
FIG. 1 is a schematic diagram of a departure control system embodying the invention.

FIG. 1 shows, generally, an airport departure control system embodying the invention 100. A central departure control system 102 communicates with a reservation system 104 and with terminals 106*a* . . . 106*n* at airports a . . . n. The reservation system, central DCS and airport terminals are those of a conventional airline operating in multiple airports. Thus, each airport terminal will include a check-in counter, a boarding pass check-in unit and a self-boarding unit if applicable. The central DCS 102 communicates with the airport terminals via a communication interface (not shown) and similarly communicates with the reservation system 104 although, in some embodiments, the reservation system and the central DCS may be modules within a common system. The hardware and software components of the central DCS are well known, as are the communications interfaces and the messaging standards.

In addition to the central DCS, a local backup DCS 108*a*, 108*b* . . . 108*n* is provided at each of the airports at which the airline operating the central DCS 102 operates. The local DCS backup 108*a*-108*n* communicates with the central DCS over communication links 110*a*, 110*b* . . . 110*n* and the local DCS backups also communicate with their respective local terminals for exchange of data with those terminals as indicated by lines 112*a*, 112*b* . . . 112*n* in FIG. 1. The local backup may be any suitable computer server with secure storage and communications interfaces to enable communication with the central DCS and the local airport terminal.

Figure 2:
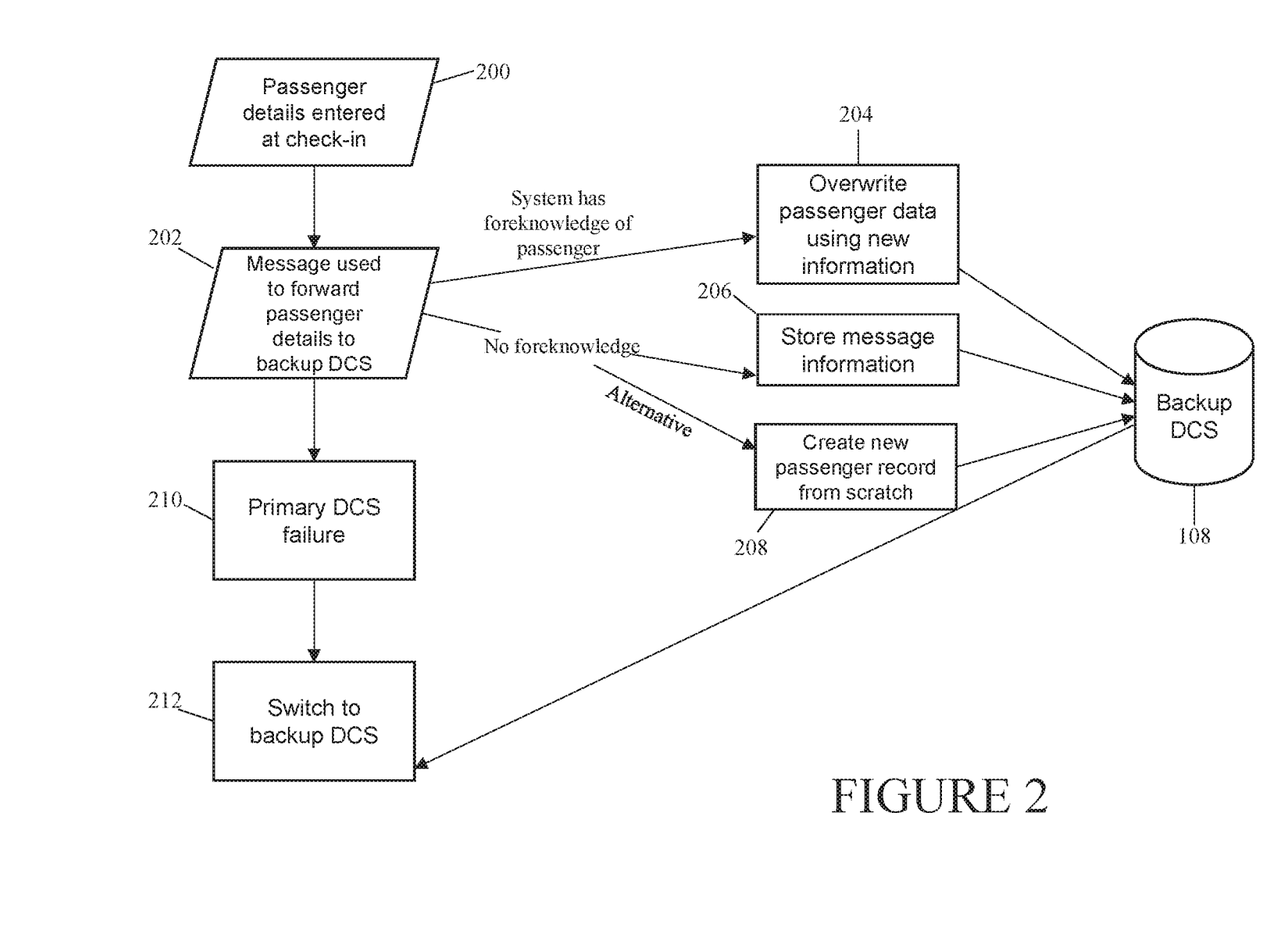
FIG. 2 is a flowchart showing a first embodiment of the invention.

The manner in which the central DCS communicates with the local backups is shown in FIG. 2. The central DCS 102 sends to each of the local backup DCS's 108*a*-108*n*, only information that is relevant to flights that depart from the airport where the local backup is situated. Thus, for local backup DCS 108*a*, the central DCS will only send information relating to flights from airport a.

The local backup DCSs are populated by a series of passenger data messages sent from the central DCS to the local backup DCSs. The passenger data messages are sent when passenger details are entered at check-in and contain passenger related information for a given flight as will be discussed in more detail below. As well as sending passenger data messages on check-in, the central DCS may send passenger data messages to the appropriate local DCS 108*a* . . . *n* whenever the passenger record in the central DCS is updated.

If the central DCS fails, connectivity is lost, there is a breach of security or some other event occurs which prevents use of the central DCS, the airline may switch over to the local DCS to handle flights from a given airport. As the local DCS communicates with the airport terminal 106 local check-in staff can access data in the local DCS. The passenger data messages that are sent from the central DCS to the local DCS contain the basic details which need to be provided to enable the local DCS to function as a local departure control system. The local DCS may be used to continue passenger check-in without loss or gaps in data.

The process is illustrated in FIG. 2. At step 200, the central DCS 102 collects passenger details on check-in. Check-in may occur in any conventional manner, for example, via a web site, via a smart device or at an airport via a check-in kiosk or a check-in desk. As mentioned above, advanced check-in may initially be registered within the reservation system 104 and check-in details passed to the central DCS 102 in a CK-IN message that is transferred with the PNL. At step 202, the passenger data message is formed from passenger related data stored in central DCS 102 and the passenger data message is sent to the appropriate local DCS backup 108. The local DCS 108 at step 204 will receive the passenger data message and overwrite any data related to the passenger already stored with the contents of the passenger data message. Alternatively, local DCS may have no knowledge of that passenger in which case it stores the passenger data message at step 206 or creates a new passenger record from scratch at 208.

In the event that a failure of the central DCS 102 is detected, which might be a failure either in the DCS itself or in the ability of an airport to access the DCS, that failure is registered at step 210 and at step 212 the backup DCS is switched in to become the temporary primary DCS for that airport. The detection may be manual in that an operator of the local DCS notices that there is no data being received from the central DCS. In that circumstance a local manager will authorise switch over to the local DCS, the local DCS being kept permanently on standby. In an alternative embodiment the process is automated and the switch over is made automatically if data or a health signal is not received from the central DCS for a predetermined period of time.

Because the local DCS 108 is a temporary store, there is no need for the local DCS to store passenger data messages for longer than is necessary to process the flight to which they relate. Once communications with the central DCS has been restored, the local DCS may, optionally, transfer the passenger data messages back to the central DCS before deleting them If the central DCS falls over while the flight is being checked-in, once the backup DCS has been switched in, further check-ins made by passengers will be handled by the local DCS. Some check-in services, such as web check-in may, not be available as, as discussed above, this check-in is via the reservation system which will also not be accessible. However, passengers may check-in on arrival at the airport either using local self-service check-in kiosks or the check-in terminal staffed by the airline. Such Check-in equipment may automatically reconfigure itself to communicate with the backup DCS on receipt of a message informing it that the central DCS is down and that the back-up DCS has assumed responsibility. Passengers who are listed as having checked-in at the point of switch-over remain checked-in.

The message may be sent in any International Air Transport Association (IATA) compliant format, for example, EDIFACT or XML. The passenger data messages may be sent individually or grouped in batches, in which case each field of the passenger data message includes an array of values for a plurality of passengers, so that the one transmitted message contains a plurality of passenger data messages with details of a batch of passenger.

The following is an example of a passenger data message and is one embodiment of the elements that may be contained in the message. Although some elements of the message will be common to most messages, some elements will vary and may be omitted. For example, the flight number and flight date would be considered essential, whereas the assigned seat is only relevant to those airlines that pre-assign seat numbers.

The passenger data message sent from the central DCS to the back-up or local DCS will contain at least the minimum information necessary to enable a passenger to be checked into a flight. An example message will contain the following information:
Airline code
Flight number
Flight date
Departure airport
Passenger name
Record Locator (.L)
Flight class
Ticket status (WL, ID, SA, etc.)
Check-in status (.R/CHKD, .R/STBY, .R/RESV, .R/OFFL, .R/BORD) (followed by boarding number and check-in party number)
Check-in order number (indicates which pax checked in together) (.R)
Assigned seat (.R/RQST)
Boarding number (included in check-in status)
Standby number (included in checkin status in place of bdg num)
Special service requests (SSR) (seats, meals, medical, etc.) (.R)
Bag tag numbers (.N)
Bag weight (.W)
Bag pooling (.P)
Inbound connection (.I)
Outbound connection(s) (.O)
Marketing flight (.M)
Security/Vetting information (.S)
Travel documents (.R/DOCS)
Unique passenger identifier (.U)
Comments (.R/CKIN)

The actual elements of the message that are required in any given circumstance will depend on circumstance. For example, where the message is being sent from a cruise ship a flight manager will typically check passengers into the DCS based on a flight information request form which will only contain basic information such as flight number, names, bag details.

An example of the passenger data message in IATA compliant format is as follows:
PDM
BB123/26JUN AMS PART1
-CDG01Y
1HUNTLEY/LEEMR.L/C123456.R/RQST HK1 12A
.R/DOCS   HK1/P/US/23423423423423/US/18JUN68/M/
08NOV20/HUNTLEY/LEE/JAMES-1HUNTLEY/LEEMR
.W/K/2/23/0 .N/0231123456002
.R/CHKD 0008 0001
ENDPDM The embodiment described is not limited to use when there is a fault condition at the central DCS or in communications with the central DCS. It may also be used, for example, when the central DCS in unavailable for other reasons such as maintenance, upgrade or a planned outage.

In the previous example, the back-up DCS is used in the event of a failure in the central DCS or in communications links with the DCS. In an alternative embodiment the local DCS may be used to check-in passengers in circumstances where there is no access to the central DCS. One example of such a circumstance is on a cruise ship or a large hotel. On some modern cruise ships a local DCS is available on-board to enable the ship operator to check-in passengers for onward flights on board the ship. However, the system requires boarding passes to be issued in advance to passengers who have to fill them in by hand.

Typically they are distributed to passengers via the ship's internal mail system. Once completed, the details then have to be entered manually onto the on-board local DCS by the cabin crew. The local DCS can perform usual DCS operations locally in a virtualised environment but connectivity issues prevent it from interacting with external DCS systems.

Traditional land based systems are not suitable for use with cruise ships and the like as communications are unreliable and intermittent. The same is true for ship-board local DCS systems trying to communicate with a land based central DCS. Real-time internet-based communications between a ship-board DCS and a central DCS are restricted by the intermittent internet connectivity that is inherent in a cruise ship environment. One possibility, when the cruise ship is distant from land, is to communicate via a satellite internet link. However this method is both prohibitively expensive and prone to sever data synchronisation problems caused by severe latency compared to real-time DCS systems. The system and method described above may be adapted to provide a local DCS system which can sync with an external DCS either periodically or in a batch, for example when the cruise ship approaches a harbour.

Figure 4:
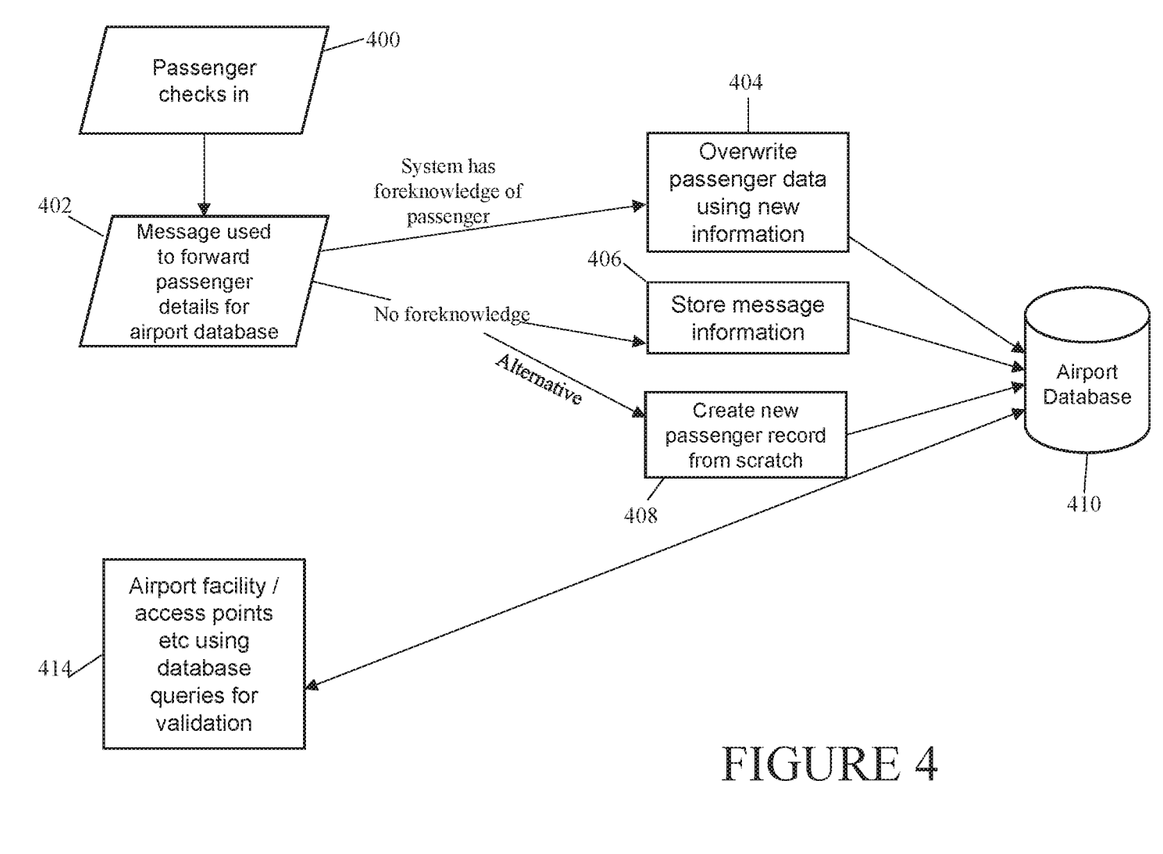
FIG. 4 is a variant of FIG. 2 showing a third embodiment of the invention.

Referring to FIG. 4, the local airport back-up DCSs have been supplemented by ship based local DCSs 208*a*, 208*b*. These are not back-ups in the sense of the back-up local DCS's of FIG. 1. This is exemplary only and a working system may have a plurality of ship based DCS and a plurality of local airport DCSs. Alternatively one or more shipboard DCS may be used in a conventional central DCS or, separately, a local DCS based system. The shipboard DCS's connection with the central DCS 102 is shown as a broken line indicating that the connection is intermittent depending on the location of the ship.

On board the ship, passengers check-in to the local DCS. This may be done at a check-in desk on board the ship or via an interface, for example located in a passenger's cabin or at strategic points around the ship. Alternatively or additionally a mobile phone or smart device using a web browser or application may be used to provide passengers with an interface to the shipboard DCS.

Once a passenger has checked in, the local DCS can forward a passenger data message, as described above, to the central DCS for the airline with which the passenger is flying. As the passenger data message is in a generic format, the passenger can be checked in regardless of the airline or the DCS they use. In many cases, a large number of the passengers on a ship will be transferring to the same flight, in which case it is convenient to transfer the passenger data messages in a batch when the shipboard DCS can access the central DCS, for example when it is sufficiently close to harbour. At that point, passengers who have disembarked from the cruise ship are checked into to their flight and can proceed through the airport in the same manner as any other passenger who has check-in in advance.

As well as being of great benefit to passengers the embodiment described above is also beneficial to smaller airports which are often used by cruise ships visiting relatively remote locations. These airports can become overwhelmed by the sudden influx of an entire cruise ship's passengers and local check-in can, as a result, be very slow. This involved passengers queuing for extended periods of time which is undesirable. It will be appreciated that the embodiment described avoids this problems entirely.

As mentioned above, the use of a DCS on board a ship is separate from the local back-up DCS of FIG. 1 and may be implemented with or without the local back-up DCS of FIG. 1.

In addition to use on board cruise ships, embodiments of this aspect of the invention may be used for land based applications where it is required to check-in a large number of people who may be travelling on the same or different airlines. One example would be a professional sports team and their entourage. A local portable DCS located at their sports ground would enable all passengers to be check-in manually in advance, for example using a laptop and then transferred to the central DCS at a later time. This aspect of the invention is similarly applicable to other applications where large numbers of people are gathered at a location and intending to catch flights. Examples include Olympic villages and other competitor residences, conference centres and the like.

Figure 3:
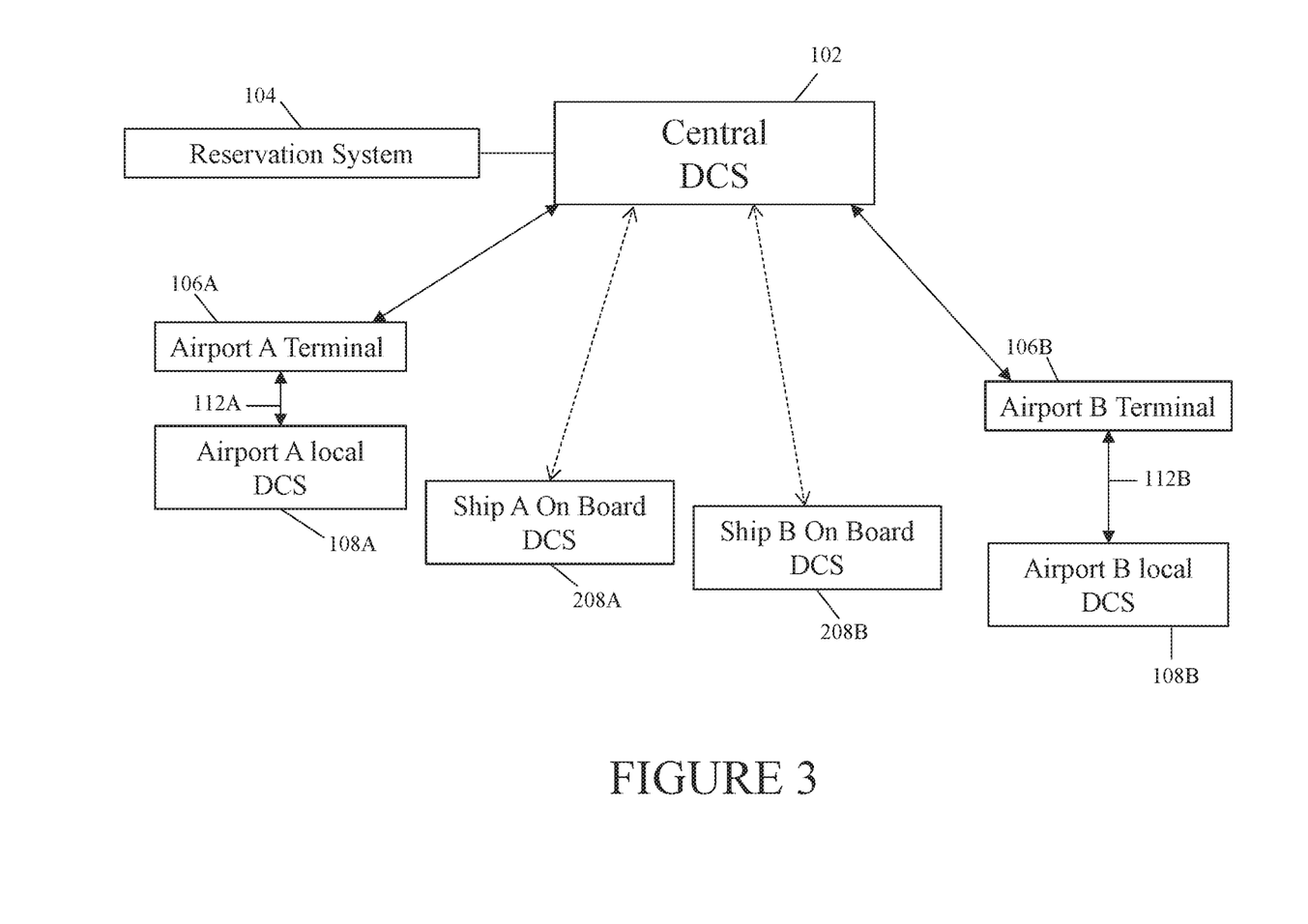
FIG. 3 is a modified version of FIG. 1 illustrating a second embodiment of the invention.

FIG. 3 illustrates an alternative to the embodiment of FIG. 1 in which the local DCS is used not in the event of a failure of the central DCS, or communications with the central DCS but where an airline chooses to store passenger data locally. The primary motivation for this may be to ensure fast and accurate local validation processes, although the system will also work if the central DCS fails as described above. Thus a passenger checks-in at step 400 and the passenger data message as described above is used at step 402 to forward the passenger's details to the local airport database 410 that forms part of the local DCS. The message is used to share passenger data into a secure database within the airport's network that is locally hosted. Where the system has foreknowledge of the passenger, the existing passenger data will be overwritten at step 404. If there is no foreknowledge, the passenger data message is stored at step 404 and a new passenger record is created at step 408. Once the passenger data message is stored in the database 410, all airport passenger access locations can use the database to validate passenger boarding pass information in a manner that is fast and secure as illustrated at step 414.

The local DCS need only store the passenger data message for a short time and, in one embodiment, passenger data for each flight is deleted automatically a given time after flight departure, for example after 24 hours.

In the embodiments described both the central and local DCSs are known components which are commercially available. The communications interfaces between the components are also well known. Departure Control Systems are available, for example from the applications which provides both a central DCS as SITA Departure Control Services and a local DCS as SITA Maestro DCS Local.

It will be appreciated by those skilled in the art that many modifications and alternatives to the embodiments described are possible within the spirit and scope of the invention which is defined by the following claims.

The invention claimed is:

1. A method of operating a computerized airline departure control system, the system comprising a central departure control system and a plurality of local departure control systems, the method comprising:

receiving, via a communications interface, check-in information for a flight from an airport for at least one passenger at the central departure control system, the central departure control system being responsible for controlling departure of the flight;

forming, from the check-in information, a passenger data message for the at least one passenger, the passenger data message comprising information necessary to validate the passenger to which it relates for boarding the flight for which the passenger is checked-in;

sending the passenger data message from the central departure control system to the respective local departure control system for the flight;

temporarily storing the passenger data message at the local departure control system;

in response to a data signal or a health signal not being received from the central departure control system for a predetermined period of time, automatically recognizing a non-availability of communications with the central departure control system;

on recognition of the non-availability of communications with the central departure control system, assuming, via the local departure control system, responsibility for the flight by handling check-ins occurring after assuming responsibility by reconfiguring check-in equipment to communicate with the local departure control system instead of the central departure control system;

receiving, via a terminal separate from the local departure control system, a boarding pass of the passenger, wherein the check-in equipment comprises the terminal;

communicating, via the terminal and over a local area airport network, the boarding pass of the passenger to the local departure control system to validate the boarding pass based on the local departure control system assuming responsibility for the flight;

validating, via the local departure control system, the boarding pass of the passenger against the passenger information stored at the local departure control system for boarding the flight for which the passenger is checked-in; and upon restoration of communications with the central departure control system:
  transferring the passenger data message back to the central departure control system; and
  deleting the passenger data message.

2. The method according to claim 1, wherein the passenger data message is sent individually from the central departure control system to the local departure control system to which the flight relates.

3. The method according to claim 1, wherein batches of passenger data messages are sent from the central departure control system to the local departure control system to which the flight relates.

4. The method according to claim 1, wherein on receipt of a passenger data message, the local DCS overwrites data relating to the passenger with the passenger data message in a database of the local departure control system.

5. The method according to claim 1, wherein on receipt of a passenger data message, the local DCS creates a new record for the passenger if no passenger record exists at the local departure control system and stores the passenger data message against the new record.

6. The method according to claim 1, wherein the non-availability of communications with the central departure control system is due to a fault at the central departure system or in communications with the central departure system.

7. The method according to claim 1, wherein the recognition of the non-availability of the central departure control system comprises automatic detection of said non-availability.

8. The method according to claim 1, wherein the passenger data message further comprises a validation for the passenger to enter secure areas of the airport.

9. A method of operating a computerized airline departure control system, the system comprising a central departure control system and a plurality of local databases, each local database having a data reference pool for validation of passenger data, the method comprising:
  receiving via a communications interface check-in information for a flight from an airport for at least one passenger at the central departure control system, the central departure control system being responsible for controlling departure of the flight;
  forming from the check-in information a passenger data message for the at least one passenger, the passenger data message comprising information necessary to validate the passenger to which it relates for boarding the flight;
  sending the passenger data message from the central departure control system to the respective local database for the flight;
  storing the passenger data message at the local database;
  in response to a data signal or a health signal not being received from the central departure control system for a predetermined period of time, recognizing a non-availability of communications with the central departure control system;
  on recognition of the non-availability of communications with the central departure control system, assuming, via the local database responsibility for the flight by handling check-ins occurring after assuming responsibility by reconfiguring check-in equipment to communicate with the local database instead of the central departure control system;
  receiving, via a terminal separate from the local database, a boarding pass of the passenger, wherein the check-in equipment comprises the terminal;
  communicating, via the terminal the boarding pass of the passenger to the local database to validate the boarding pass based on the local database assuming responsibility for the flight;
  validating, via the local database, the boarding pass of the passenger against passenger information stored at the local database for boarding the flight for which the passenger is checked-in; and
  upon restoration of communications with the central departure control system:
    transferring the passenger data message back to the central departure control system; and
    deleting the passenger data message.

10. A computerized airline departure control system, comprising
  a central departure control system for controlling departure of flights from a plurality of airports, and
  a plurality of local departure systems, each local departure control system for controlling departure of flights from an individual airport,
  wherein the central departure control system includes a communications interface and is arranged to:
    receive check-in information for a flight from an airport for at least one passenger via a communications network, the central departure control system being responsible for controlling departure of the flight;
    generate a passenger data message for the at least one passenger, the passenger data message comprising information necessary to validate the passenger to which it relates for boarding the flight for which the passenger is checked-in; and
    send the passenger data message via the communications network to the respective local departure control system for the flight;
  check-in equipment configured to automatically reconfigure itself to communicate with the local departure control system instead of the central departure control system in response to receiving a message that the central departure control system is unavailable and the local departure control system has assumed responsibility;
  the local departure control systems each comprising a communications interface and a store for storing the received passenger data messages;
  wherein the local departure control systems are configured to:
    in response to a data signal or a health signal not being received from the central departure control system for a predetermined period of time, recognize a non-availability of communications with the central departure control system;
    on recognition, assume responsibility for the flight by checking-in unchecked-in passengers via a terminal after assuming responsibility, wherein the terminal is separate from the local departure control system; and
    upon restoration of communications with the central departure control system:
      transfer the passenger data message back to the central departure control system; and
      delete the passenger data message.

11. The system according to claim 10, wherein the central departure control system is configured to send the passenger data message individually to the local departure control system to which the flight relates.

12. The system according to claim 10, wherein the central departure system is configured to send batches of passenger data messages to the local departure control system to which the flight relates.

13. The system according to any of claim 10, wherein the local departure control system is configured, to overwrite data relating to the passenger with the passenger data message in a database of the local departure control system, on receipt of a passenger data message.

14. The system according to claim 10, wherein the local departure control system is configured to create a new record for the passenger, on receipt of a passenger data message, if no passenger record exists at the local departure control system and to store the passenger data message against the new record.

15. The system according to claim 10, wherein the non-availability of communications with the central departure control system is due to a fault at the central departure system or in communications with the central departure system.

16. The system according to claim 10, wherein the local departure control system automatically detects the non-availability of the central departure control system.

17. The system according to claim 10, wherein the passenger data message further comprises a validation for the passenger to enter secure areas of the airport.

18. A method of operating a computerized airline departure control system, the system comprising a central departure control system and a plurality of local departure control systems, the method comprising:
  receiving via a communications interface check-in information for a flight from an airport for at least one passenger at the central departure control system, the central departure control system being responsible for controlling departure of the flight;
  forming from the check-in information a passenger data message for the at least one passenger, the passenger data message comprising information necessary to validate the passenger to which it relates for boarding the flight for which the passenger is checked-in;
  sending the passenger data message from the central departure control system to the respective local departure control system for the flight, the local departure control system being a part of a local airport network;
  storing the passenger data message in a secure database at the local departure control system;
  in response to a data signal or a health signal not being received from the central departure control system for a predetermined period of time, recognizing a non-availability of communications with the central departure control system;
  on recognition of the non-availability of communications with the central departure control system:
    reconfiguring check-in equipment to communicate with the local departure control system instead of the central departure control system; and
    providing access to the passenger data message stored in the secure database to systems connected to the local airport network for the local departure control system to assume responsibility for validation of a passenger boarding pass to which the passenger data message relates in response to non-availability of communications with the central departure control system;
    validating, via the systems connected to the local area network, the passenger boarding pass against the passenger data message stored in the secure database for which access is provided for boarding the flight for which the passenger is checked-in; and
  upon restoration of communications with the central departure control system:
    transferring the passenger data message back to the central departure control system; and
    deleting the passenger data message.

19. A method of operating a computerized airline departure control system, the system comprising a central departure control system and a plurality of local departure control systems, the method comprising:
  forming, from check-in information for a plurality of flights from a plurality of airports and via the central departure control system, a plurality of passenger data messages for at least one passenger, the plurality of passenger data messages comprising information necessary to validate the at least one passenger to which it relates for boarding the plurality of flights for which the at least one passenger is checked-in;
  sending, from the central departure control system, a first passenger data message of the plurality of passenger data messages to a first local departure control system for a first flight and a second passenger data message of the plurality of passenger data messages to a second local departure control system for a second flight;
  temporarily storing the first passenger data message at the first local departure control system;
  temporarily storing the second passenger data message at the second local departure control system;
  in response to a data signal or a health signal not being received from the central departure control system for a predetermined period of time, automatically recognizing a non-availability of communications with the central departure control system;
  on recognition of the non-availability of communications with the central departure control system from the first local departure control system, assuming, via the first local departure control system, responsibility for the first flight by handling check-ins occurring after assuming responsibility by reconfiguring check-in equipment to communicate with the first local departure control system instead of the central departure control system;
  on recognition of the non-availability of communications with the central departure control system from the second local departure control system, assuming, via the second local departure control system, responsibility for the second flight by handling check-ins occurring after assuming responsibility by reconfiguring check-in equipment to communicate with the second local departure control system instead of the central departure control system;
  receiving, via a terminal separate from the first local departure control system, a boarding pass of one of the at least one passenger, wherein the check-in equipment comprises the terminal;
  communicating, via the terminal and over a local area airport network, the boarding pass to the first local departure control system to validate the boarding pass based on the first local departure control system assuming responsibility for the first flight;

validating, via the first local departure control system, the boarding pass against passenger information stored at the first local departure control system for boarding the first flight for which the at least one passenger is checked-in; and upon restoration of communications with the central departure control system:
  transferring the first passenger data message back to the central departure control system; and
  deleting the first passenger data message.

\* \* \* \* \*